Patented May 5, 1925.

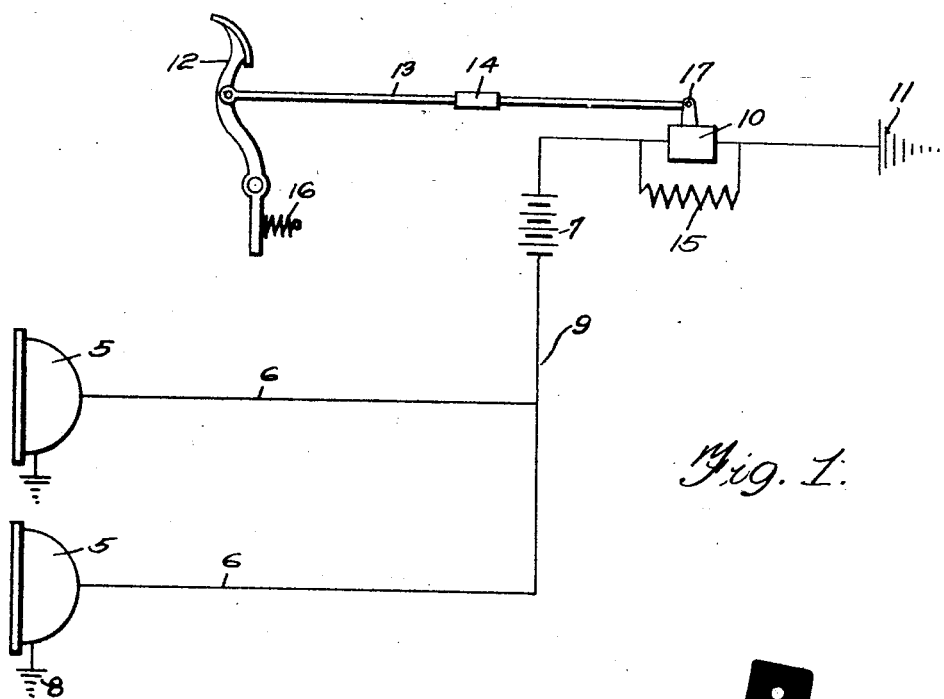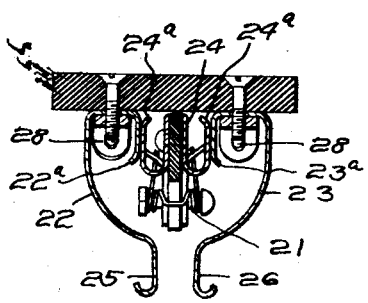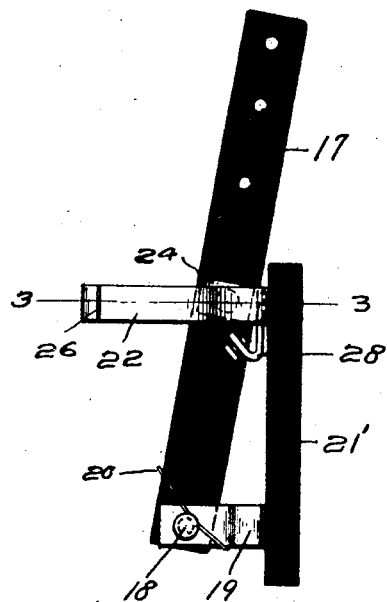

1,536,366

UNITED STATES PATENT OFFICE.

CARL M. WISEMAN, OF LOUISVILLE, KENTUCKY.

AUTOMATIC HEADLIGHT-DIMMING ATTACHMENT FOR AUTOMOBILES.

Application filed January 11, 1924. Serial No. 685,608.

*To all whom it may concern:*

Be it known that I, CARL M. WISEMAN, a citizen of the United States, residing at Louisville, in the county of Jefferson and State of Kentucky, have invented certain new and useful Improvements in Automatic Headlight-Dimming Attachments for Automobiles, of which the following is a specification, reference being had therein to the accompanying drawings.

This invention relates to an automatic headlight dimming attachment for automobiles and it has for its object to provide means associated with either the clutch or the brake pedal of the automobile and operable to automatically dim the headlights when the brake is applied or when the clutch is thrown out of engagement. By virtue of this arrangement the driver of an automobile is enabled to dim his headlights without the necessity of removing his hands from the steering wheel. Many fatal accidents have been caused by the driver of an automobile releasing his hold upon the steering wheel to operate the control switches of his headlights for the purpose of dimming the same upon the approach of another automobile. It is a well known fact that most drivers, as a matter of habit, slip their clutches to release position or apply the brakes, or both, slowing up when they find their view of the road ahead impaired by the rays from the headlights of an approaching automobile. It is the purpose of the present invention to utilize this practice to cause to automatic dimming of the headlights.

It is a further object of the invention to provide a structure which, when utilized in conjunction with the brake pedal, will cause the lights to be brightly lighted when no pressure is applied to the brake pedal, will cause the lights to dimmed when only light pressure is applied to the brake pedal and will cause the lights to be brightly lighted when the brakes are vigorously applied, as in the case of emergency or in descending a steep hill where it is necessary to apply the brakes in addition to the retarding effect of the throttled engine.

Further objects and advantages of the invention will be set forth in the detailed description which follows.

In the accompanying drawing:

Fig. 1 is a diagrammatic view illustrating the method of application of the invention;

Fig. 2 is a side elevation of the switch employed; and

Fig. 3 is a horizontal sectional view on line 3—3 of Fig. 2.

Like numerals designate corresponding parts in all of the figures of the drawing.

In the drawing 5 designates the headlights of an automobile and 6 the conductors for supplying current thereto from a battery 7. These headlights are grounded at one side as indicated at 8. When the clutch and brake pedals are in their normal position, the circuit is completed from battery 7 through a conductor 9 and switch 10 to ground 11 and this causes the headights to burn with full strength. If, however, the clutch or brake pedal as the case may be, and which pedal has been indicated diagrammatically at 12, be thrust forwardly, either to apply the brakes or to disconnect the clutch in the usual and well known way, a rod 13 having a turn-buckle 14 in its length will move the switch to open position so that the path of the current must be through a resistance coil 15 and thus the lights will be dimmed. It is a well known fact that pedals such as that indicated at 12 are returned to normal position under the action of a comparatively powerful spring and I have diagrammatically illustrated such a spring at 16. It will be noted that the rod 13 provides a positive connection between the pedal 12 and the switch 10 and that the turn-buckle 14 provides means for determining the throw of the switch. This is of importance since the movement of the switch 10 is thereby rendered very positive. Experience has shown that switches used on these automatic devices on automobiles must have springs strong enough to move their parts positively under all conditions. These switches must operate in clouds of dust and they become caked with dirt and dry for lack of oil and where mere cords or cables are relied upon to operate them it is frequently the case that when the said cord or cable is slackened the switch does not respond because of lack of oil or because it is caked with dirt. I, therefore, prefer to positively connect the movable element of the switch with the brake pedal in such manner that this switch element will be moved positively in both directions from the pedal.

The movable element of the switch to which the rod 13 is connected comprises a fiber or other lever of insulating material 17. This lever is pivoted at 18 between the ears of a bracket 19. A spring 20 has its bight portion engaged with the forward edge of said lever and is continued around a screw 21 which constitutes the pivot of the lever, the terminal ends of the spring being engaged beneath the ears 19. The ears 19 are secured to a base 21' of fiber or other insulating material and this base also carries contact strips 22 and 23 between which the upper portion of the lever 17 moves. A contact strip 24 is secured to the lever 17 and has its end portions bent to form spring contact members 24ª which coact with spring contact ends 22ª and 23ª of the strips 22 and 23. The free ends of the strips 22 and 23 are bowed to form contact portions 25 and 26 with which the contact strip 24 engages if the lever 17 be moved forwardly far enough to do so. In other words with the lever 17 in its retracted position or in the position illustrated in Fig. 2, a circuit is completed through wire 9 which has included in its length binding posts 27 and 28. At this time the circuit is through binding post 27 and contact strip 24 to binding post 28. If the lever 17 be moved forwardly only enough to move the contact strip 24 out of engagement with the contact ends 22ª and 23ª of the strips 22 and 23, circuit through the switch is broken and the only path for the current includes the resistance coil 15 and at this time the lights will be dimmed. If, however, the rod 13 is connected to a brake pedal, as is contemplated, vigorous application of the brakes will result in moving the lever 17 far enough forward to cause the contact strip 24 to bridge the gap between the outer ends 25 and 26 of the strip 23. It is manifest that this will again complete a circuit through the switch and cut the resistance coil out of action so that in this latter position the lights will burn brightly.

By proper adjustment of the turn-buckle 14 I may so arrange the throw of the parts that the lever 17 will be moved to its intermediate position i. e. where the contact strip 24 will not be in contact with any part of the strips 22 and 23 upon very slight movement of the brake lever and before the brake pedal has moved enough to produce any appreciable breaking action upon the machine. Under such an adjustment as this the driver of an automobile may dim his headlights by merely letting his foot rest lightly upon the brake pedal, it being a well known fact that most drivers keep their right foot resting lightly upon the brake pedal at all times. The result will be that in a case of emergency when the brakes are applied suddenly and vigorously the lights will be brightened to give the driver a full view of the road to aid him in avoiding disaster, as far as possible. If, upon the other hand, the road is wholly clear and in good condition he may brighten his lights by merely relieving the pressure upon the brake pedal.

It is to be understood that the invention is not limited to the precise construction set forth but that it includes within its purview whatever changes fairly come within either the terms or the spirit of the appended claims.

Having described my invention what I claim is:

1. The combination with an automobile, its headlights and an operating pedal of the same having an electric circuit in which said lights are included, a switch in said circuit and through which said circuit is completed when the switch is in closed position, a dimmer coil operative when said switch is in open position and a connection between said pedal and said switch, the switch comprising two circuit completing positions one of which is operative when pressure upon the pedal is released and the other of which is operative when pressure is vigorously applied to said pedal, said switch occupying an open position between these two points.

2. The combination with an automobile, its headlights and an operating pedal of the same, of an electric circuit in which said lights are included, a switch in said circuit, a connection between the pedal and the switch for operating said switch upon movement of the pedal, said switch comprising a movable element carrying a contact piece and fixed contact pieces with which the first named contact piece makes connection at both of its limits of movement the throw of the parts being such that the first named contact piece occupies non-contacting position between such limits of movement.

3. The combination with an automobile, its headlights and an operating pedal of the same, of an electric circuit in which said lights are included, a switch in said circuit, a dimmer coil operative when said switch is in open position, and adjustable connection leading from said pedal to said switch, said switch comprising a swinging lever to which said connection is attached, fixed contact strips between which said lever moves, and a spring contact strip carried by said lever, said fixed contact strip comprising contact portions engageable with the contact strip of the lever at each limit of movement of the lever and accupying a non-contacting position between such limits of movement.

In testimony whereof I hereunto affix my signature.

CARL M. WISEMAN.